United States Patent
Lazaridis (10) Patent No.: US 7,400,897 B2
(45) Date of Patent: Jul. 15, 2008

(54) IMPLEMENTING A WEB SERVER ON A MOBILE STATION

(75) Inventor: Mihal Lazaridis, Waterloo (CA)

(73) Assignee: Research in Motion Limited, Waterloo (CA)

( * ) Notice: Subject to any disclaimer, the term of this patent is extended or adjusted under 35 U.S.C. 154(b) by 190 days.

(21) Appl. No.: 10/861,763

(22) Filed: Jun. 4, 2004

(65) Prior Publication Data

US 2005/0049001 A1  Mar. 3, 2005

Related U.S. Application Data

(60) Provisional application No. 60/536,400, filed on Jan. 14, 2004, provisional application No. 60/497,544, filed on Aug. 25, 2003.

(51) Int. Cl.
*H04B 7/00* (2006.01)
*H04L 12/54* (2006.01)
*H04L 12/56* (2006.01)
*G06F 15/173* (2006.01)

(52) U.S. Cl. .............. 455/507; 370/395.54; 370/338; 709/223

(58) Field of Classification Search ........... 455/11.1, 455/7, 412.1, 16, 552.1; 370/395.54, 338; 709/223
See application file for complete search history.

(56) References Cited

U.S. PATENT DOCUMENTS

| | | | | |
|---|---|---|---|---|
| 6,147,986 A * | 11/2000 | Orsic | ........................ | 370/349 |
| 6,434,600 B2 * | 8/2002 | Waite et al. | ............... | 709/206 |
| 6,614,774 B1 * | 9/2003 | Wang | ........................ | 370/338 |
| 6,636,854 B2 * | 10/2003 | Dutta et al. | ................... | 707/10 |
| 6,781,972 B1 * | 8/2004 | Anderlind et al. | .......... | 370/329 |
| 6,983,310 B2 * | 1/2006 | Rouse et al. | ................ | 709/206 |
| 6,990,339 B2 * | 1/2006 | Turanyi et al. | .......... | 455/432.1 |
| 7,054,271 B2 * | 5/2006 | Brownrigg et al. | ......... | 370/238 |
| 7,296,075 B2 * | 11/2007 | Lynggaard | .................. | 709/227 |

(Continued)

FOREIGN PATENT DOCUMENTS

WO  WO 2004/081708 A2  9/2004

OTHER PUBLICATIONS

Karypidis, et al.: "Harnessing the Potential of Mobile Personal Data Repositories," IEEE, Jan. 6, 2003, pp. 294-303, XP010626733, ISBN: 0-7695-1874-5.

(Continued)

*Primary Examiner*—Lester Kincaid
*Assistant Examiner*—Matthew C Sams
(74) *Attorney, Agent, or Firm*—Jones Day; Krishna K. Pathiyal; Robert C. Liang (57) ABSTRACT

A system and method are provided for implementing a web server on a mobile station. A first mobile station may include a database of information. A network address for the first mobile station may be transmitted to a second mobile station to enable the second mobile station to communicate with the first mobile station directly over a wireless network. The second mobile station may then be provided access to the database of information by communicating directly over the wireless network with the first mobile station, wherein the first mobile station operates as the wireless server for the second mobile station.

14 Claims, 5 Drawing Sheets

U.S. PATENT DOCUMENTS

| | | | |
|---|---|---|---|
| 2002/0028656 A1* | 3/2002 | Yemini et al. | 455/41 |
| 2002/0163889 A1* | 11/2002 | Yemini et al. | 370/238 |
| 2003/0081579 A1 | 5/2003 | Tosey et al. | |
| 2003/0119486 A1* | 6/2003 | Tari et al. | 455/412 |
| 2004/0063445 A1* | 4/2004 | Vaananen | 455/466 |
| 2004/0151192 A1* | 8/2004 | Trossen | 370/401 |
| 2004/0179537 A1* | 9/2004 | Boyd et al. | 370/395.54 |
| 2004/0190495 A1* | 9/2004 | White et al. | 370/352 |

OTHER PUBLICATIONS

Haahr, et al.: "Towards a Generic Architecture for Mobile Object-Oriented Applications," IEEE, Dec. 1, 2000, pp. 91-96, XP010551468, ISBN: 0-7803-7133-X.

Wall, et al.: "Mobile RMI: Supporting Remote Access to Java Server Objects on Mobile Hosts," IEEE, Sep. 17, 2001, pp. 41-51, XP010560709, ISBN: 0-7695-1300-X.

* cited by examiner

IMPLEMENTING A WEB SERVER ON A MOBILE STATION

CROSS-REFERENCE TO RELATED APPLICATION

This application claims priority from and is related to the following prior applications: "Implementing a Web Server on a Mobile Station," U.S. Provisional Application No. 60/497,544, filed Aug. 25, 2003; and "Implementing a Web Server on a Mobile Station," U.S. Provisional Application No. 60/536,400, filed Jan. 14, 2004. The entirety of these prior applications are hereby incorporated into the present application by reference.

FIELD

The technology described in this patent document relates generally to the field of wireless communications. More particularly, the patent document describes a system and method for implementing a web server on a mobile station.

BACKGROUND AND SUMMARY

Mobile stations are typically used as clients within wireless networks. While operating as a wireless client, a mobile station may access host services and information to satisfy a range of requirements.

The technology described in this patent document provides a system and method for implementing a web server on a mobile station. A first mobile station may include a database of information. A network address for the first mobile station may be transmitted to a second mobile station to enable the second mobile station to communicate with the first mobile station directly over a wireless network. The second mobile station may then be provided access to the database of information by communicating directly over the wireless network with the first mobile station, wherein the first mobile station operates as the wireless server for the second mobile station.

The mobile station operating as a wireless server may include a communication subsystem, a memory subsystem, a processing subsystem, and a wireless server module. The communication subsystem may be operable to send and receive communications over the wireless network. The memory subsystem may be operable to store data and program information, including a server database. The processing subsystem may be operable to store and retrieve data in the memory subsystem, execute programs stored in the memory subsystem, and cause the communication subsystem to transmit and receive communications over the wireless network. The wireless server module may be stored in the memory subsystem and executed by the processing subsystem. The wireless server module when executed by the processing subsystem may be operable to cause the wireless server to transmit a network address for the wireless server to a wireless client, the network address enabling the wireless client to communicate with the wireless server directly over the wireless network to access information in the server database.

DETAILED DESCRIPTION

Figure 1:
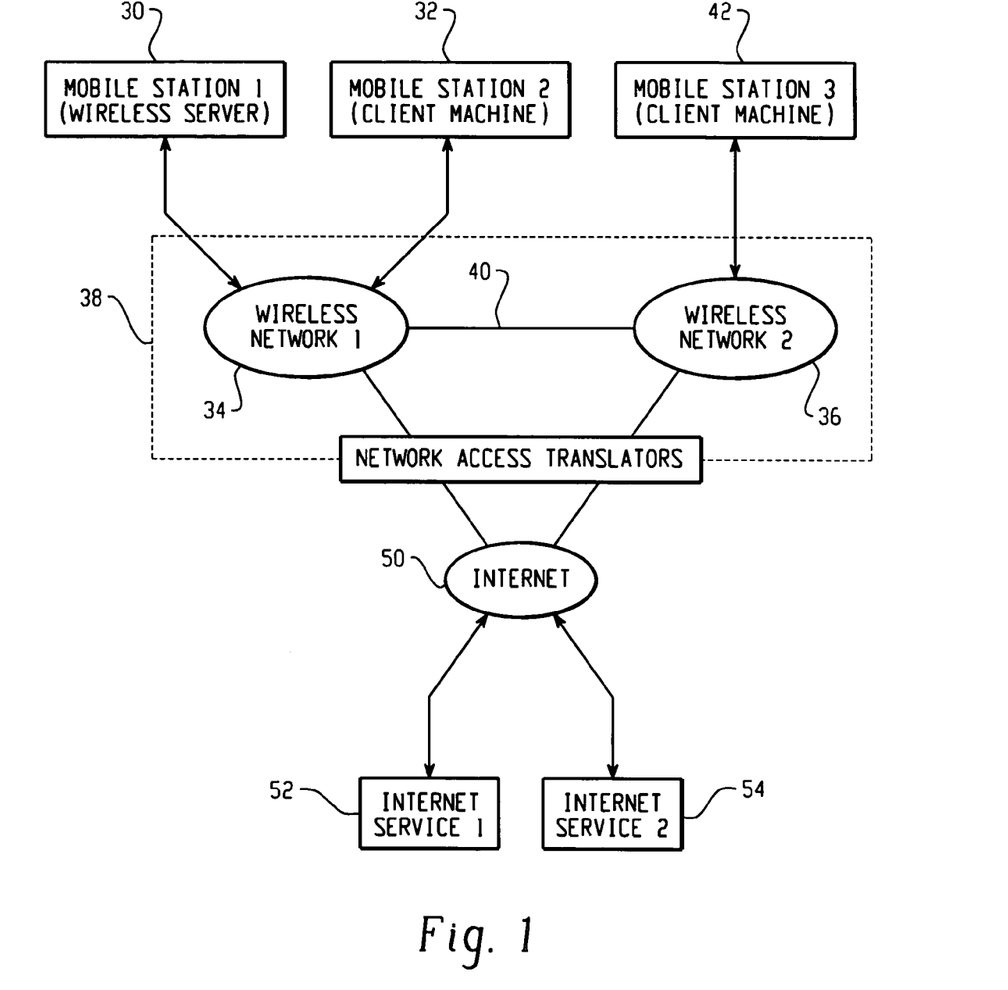
FIG. 1 is a block diagram of an example wireless network that may include a wireless server.

With reference now to the drawing figures, FIG. 1 is a block diagram of an example wireless network 38 that may include a wireless server 30. The example wireless network 38 is an IP network that includes a plurality of wireless carriers 34, 36 that enable a plurality of mobile stations 30, 32, 42 to communicate wirelessly. In addition, one or more mobile stations 30, 32 and 42 may communicate through a wireless carrier 34, 36 to various Internet services 52, 54 accessible through network address translators (NATs) on the Internet 50. The wireless carriers 34, 36 may, for example, include GSM/GPRS networks, CDPD networks, TDMA networks, iDEN networks, EDGE networks, UMTS networks, or others.

To connect with one of the Internet services 52, 54, the mobile stations 30, 32, 42 are typically assigned network-based IP addresses. A service request (e.g., TCP/IP or WAP requests) from the mobile stations 30, 32, 42 may then be routed through NATs that use valid Internet addresses for connecting to the Internet services 52, 54.

In order to increase the number of directly addressable IP addresses, a mobile station 30 may be configured as a wireless server 30. A mobile station 30 configured as a wireless server 30 may, for example, operate as a wireless HTTP server to accept TCP/IP or UDP/IP connections of various kinds. The IP address of the wireless server 30 may be advertised and distributed to other mobile stations (wireless clients) 32, 42 to enable direct wireless access to the wireless server 30. The use of the wireless server 30 may, for example, enable the address space of two networks 34 and 36 to be consolidated through a VPN or wide area network bridge, thus increasing the number of directly addressable IP addresses. Moreover, the type, volume and frequency of information accessed from a wireless server 30 should typically be less than that accessed from a land-line network server 52, 54. Thus, the use of a wireless server 30 may help to preserve network capacity and to prevent base station congestion.

The wireless server 30 may provide its IP address to other mobile stations (wireless clients) 32, 42, as described below, in order to enable direct access via the wireless network 38. In addition, if the IP address of the wireless server 30 is dynamic (e.g., temporarily assigned by the wireless network 38), then the wireless server 30 may include an IP monitoring agent to monitor the current IP address of the wireless server 30. If the IP monitoring agent detects that the wireless network 38 has assigned a new IP address to the wireless server 30, then the updated IP address may be provided to the wireless clients 32, 42. In addition, the IP monitoring agent may include an associative table to indicate which of the wireless clients 32, 42 should be notified of IP address changes.

Figure 2:
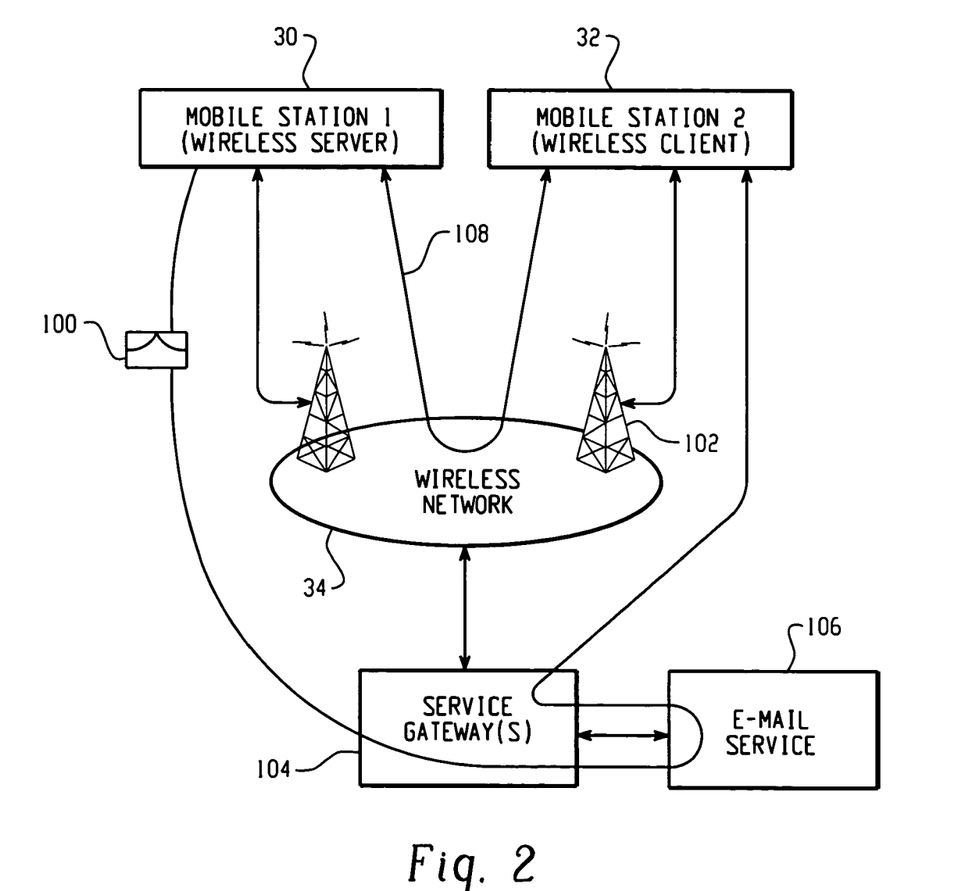
FIGS. 2 and 3 are block diagrams illustrating two example methods for exchanging IP addressing information between mobile stations.
Figure 3:
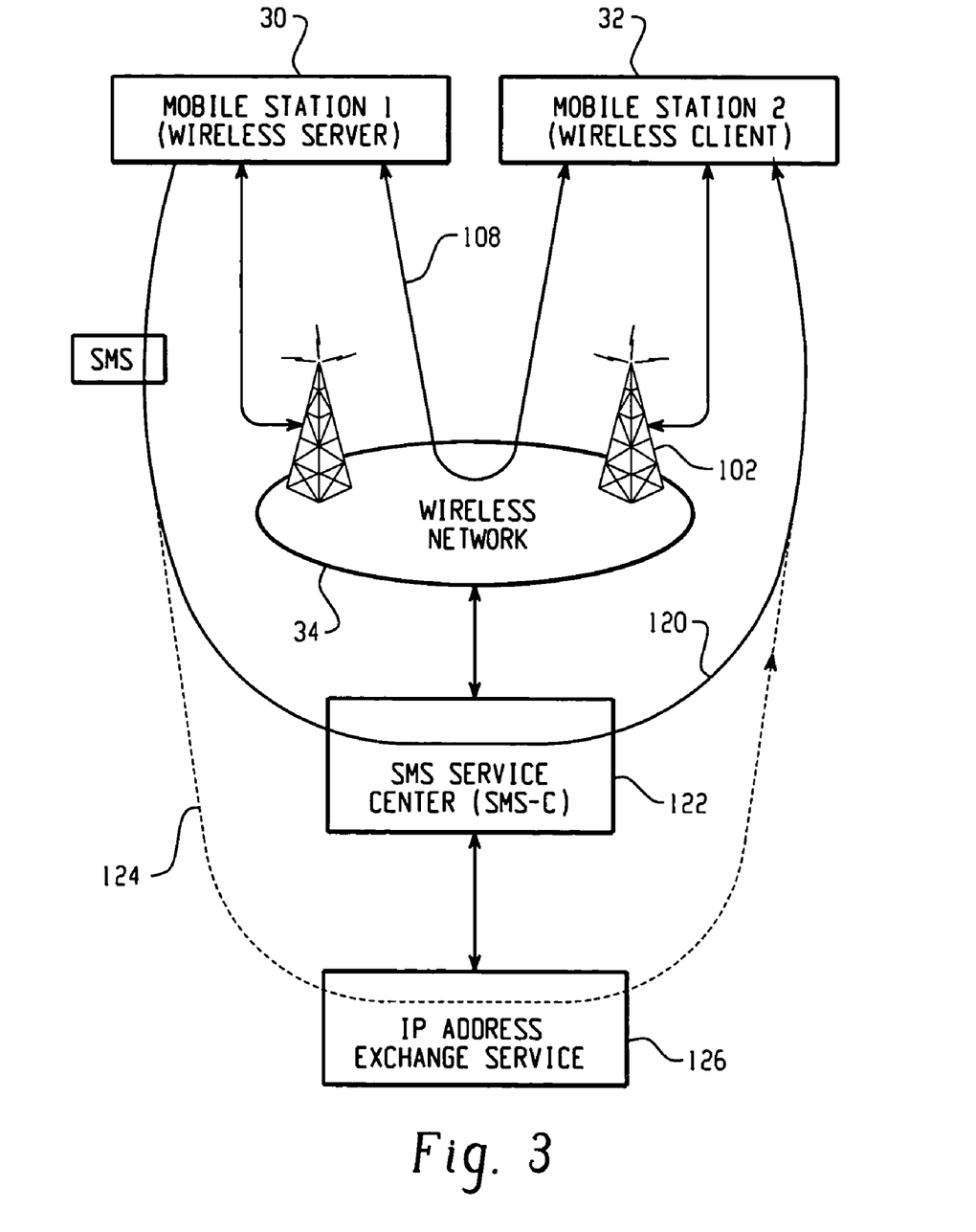

FIGS. 2 and 3 are block diagrams illustrating two example methods for exchanging IP addressing information between mobile stations 30, 32. With reference first to FIG. 2, an example system and method is illustrated for providing a wireless client 32 with the IP address of a wireless server 30 using an electronic messaging (email) service 106. The example of FIG. 2 uses an existing email service 106 to transmit the current IP address of the wireless server 30 within an electronic message (email) sent from the wireless server 30 to the wireless client 32. Also illustrated in FIG. 2 is a service gateway(s) 104 that interfaces the wireless network(s) 34 with the email service 106.

In operation, an email 100 containing the current IP address of the wireless server 30 may be transmitted over the wireless network(s) 34 to a service gateway 104. The service gateway 104 provides an interface between the wireless network 34 and a land-line computer network, such as the Internet. The email 100 containing the IP address is sent from the service gateway 104 to the email service 106, for example via the Internet. The email service 106 then delivers the email 100 back through a service gateway 104 over the wireless network(s) 34 to the wireless client 32. The email service 106 may, for example, be a network based service maintained by a wireless network operator, a publicly available email service, an Internet service provider (ISP) service, a corporate (LAN-based) email service, or others.

Upon receiving the current IP address for the wireless server 30, the wireless client 32 may transmit its current IP address to the wireless server 30 to enable direct two-way communication over the wireless network 34. The wireless client 32 may, for example, send its current IP address to the wireless server 30 directly over the wireless network, by a return email, or by some other means. Once the IP addresses have been exchanged, the two mobile stations 30 and 32 may communicate directly 108 using only wireless network resources 102.

In addition, the wireless server 30 may include an IP monitoring agent that monitors the current IP address of the wireless server 30. The IP monitoring agent may, for example, detect changes to the current IP address of the wireless sever 30 by monitoring a flash memory in the mobile station 30. (See, e.g., FIG. 5). If the IP monitoring agent detects that the IP address of the wireless server 30 has been changed, then the IP monitoring agent may send an email message 100 (or other type of communication) to the wireless client 32 and/or other mobile stations that have registered for information from the wireless server 30. The IP monitoring agent may, for example, include an associated table that identifies mobile stations that should be notified (e.g., based on their email addresses) of a change in the IP address of the wireless server 30.

FIG. 3 is a block diagram showing an example system and method for providing a wireless client 32 with the IP address of a wireless server 30 using an SMS service point. The service provider for the SMS service is the SMS Service Center (SMS-C) 122, which operates as a gateway for routing SMS messages over the wireless network(s) 34 between mobile stations 30, 32.

In the example of FIG. 3, two paths are illustrated for sending SMS messages between the wireless server 30 and the wireless client 32. A first path 120 may be used to send an SMS message containing the IP address of the wireless server 30 directly through the SMS-C gateway 122. A second path 124 may be used to route the SMS message containing the IP address of the wireless server 30 through a gateway external to the SMS-C, called the IP address exchange service 126. The IP address exchange service 126 may be used (e.g., instead of an IP monitoring agent in the wireless server) to maintain a list of all wireless clients that are registered to receive IP address updates from the wireless server. The IP address exchange service 126 may then publish the received SMS message from the wireless server 30 to all registered wireless clients 32.

Upon receiving the current IP address of the wireless server 30, the wireless client 32 may transmit its current IP address to the wireless server 30 to enable direct two-way communication over the wireless network 34. The wireless client 32 may, for example, send its current IP address to the wireless server 30 directly over the wireless network, by a return SMS message, or by some other means. Once the IP addresses have been exchanged, the two mobile stations 30 and 32 may communicate directly 108 using only wireless network 36 resources 102. In this manner, a range of peer-to-peer or client-server services may be provided. For example, an instant messaging conversation may take place between two or more peers in a collaborative group. In another example, one mobile station 30 may act as a web server and allow the second mobile station 32 to attach using HTTP protocols to provide web pages for information exchange. Alternatively, the IP address could be exchanged through an Instant Messaging server, by calling the user's cellular phone to dictate the currently assigned IP address by voice, or by some other means.

Figure 4:
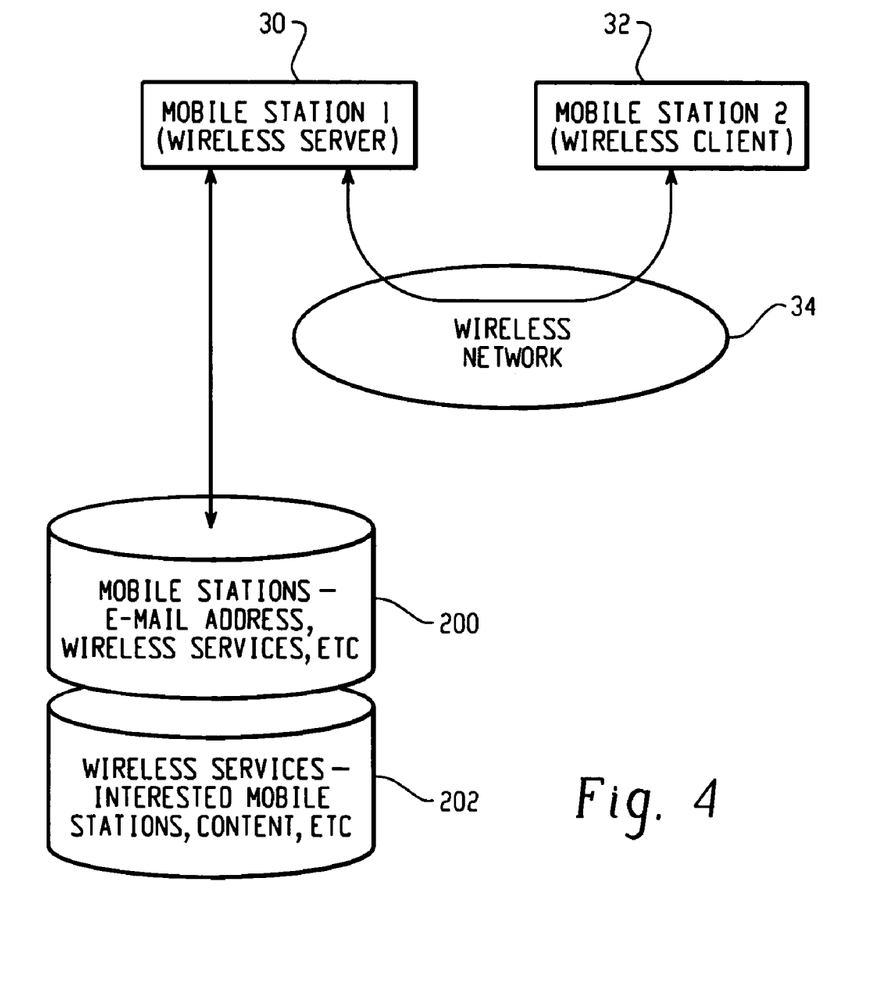
FIG. 4 is a block diagram illustrating example server databases that may be included on a wireless server for access by wireless clients.

FIG. 4 is a block diagram illustrating example server databases 200, 202 that may be included on a wireless server 30 for access by wireless clients 32. A registration database 200 may be included for storing a list of registered wireless clients 32 along with contact information for each wireless client(s) 32, such as an email address, SMS name, peer-to-peer information, personal address information, and/or other information. In addition, one or more wireless service databases 202 may be included for storing information available to wireless clients 32. The wireless service database(s) 202 may also identify the wireless client(s) 32 registered to receive information from the database 202. For example, the wireless service database(s) 202 may include information such as sport scores, photos from an important soccer match including a photo of the winning goal, patient files for doctors, weather information, and/or other information.

By leveraging the fact that the wireless server 30 is mobile, an entirely new set of services can be exposed to wireless clients 32. The mobile server 30 may also maintain some or all of this information in an off-network IP address exchange service, as shown in FIG. 3. The IP address exchange service 126 may be operable to help the wireless server 30 manage sending email or SMS information to mobile clients 32 when either the information has changed or when the IP address of the server has changed. In this manner, the wireless server 30 need only send a message to the IP address exchange service 126 informing it of the change so that the information can be propagated to other affected mobile stations 32.

An IP-based wireless network allows traditional protocols to be used over IP. For example, HTTP can be used over TCP/IP to access web content on the mobile web server 30. In alternative embodiments, however, other protocols may be utilized. For example, HHP could be used over UDP/IP to avoid problems associated with using TCP over a wireless link. In another example, HTTP could be used over a proprietary protocol over IP. This is type of protocol is often used in wireless networks when an HTTP proxy server is operating as an interface for accessing Internet content.

Figure 5:
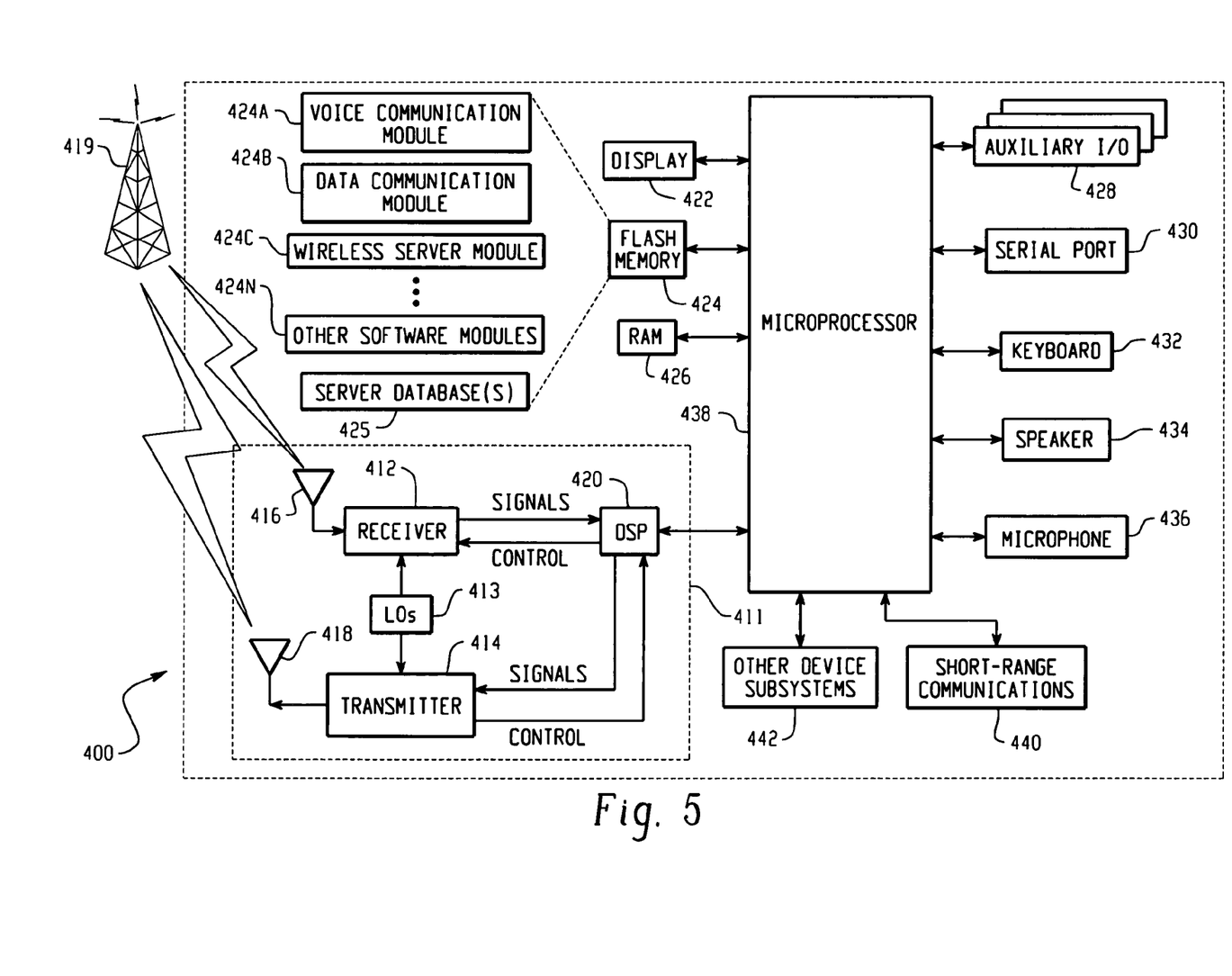
FIG. 5 is a block diagram illustrating an example mobile station that may be configured as a wireless server.

FIG. 5 is a block diagram illustrating an example mobile station 400 that may be configured as a wireless server 30. The mobile station 400 includes a processing subsystem 438, a communications subsystem 411, a short-range communications subsystem 440, a memory subsystem 424, 426, and various other device subsystems and/or software modules 442. The mobile station 400 also includes a user interface, which may include a display 422, a keyboard 432, a speaker 434, a microphone 436, one or more auxiliary input/output devices 428, a serial port 430, and/or other user interface devices.

The processing subsystem 438 controls the overall operation of the mobile station 400. Operating system software executed by the processing subsystem 438 may be stored in a persistent store, such as a flash memory 424, but may also be stored in other types of memory devices in the memory subsystem, such as a read only memory (ROM) or similar storage element. In addition to the operation system, the flash memory 424 may include a plurality of software application programs executed by the processing subsystem 428, such as a voice communication module 424A, a data communication module 424B, a wireless server module 424C, and/or other software modules 424N. The wireless server module 424C may be operable to cause the mobile station 400 to perform the wireless server operations described above with reference to FIGS. 1-4, and may include an IP monitoring agent as described above. In addition, the flash memory 424 may include one or more server databases 425, as described above with reference to FIG. 4.

System software, specific device applications, or parts thereof, may be temporarily loaded into a volatile store, such as a random access memory (RAM) 426. Communication signals received by the mobile station 400 may also be stored to RAM 426.

Communication functions, including data and voice communications, are performed through the communication subsystem 411, and possibly through the short-range communications subsystem 440. The communication subsystem 411 includes a receiver 412, a transmitter 414 and one or more antennas 416, 418. In addition, the communication subsystem 411 also includes a processing module, such as a digital signal processor (DSP) 420 or other processing device(s), and local oscillators (LOs) 413. The specific design and implementation of the communication subsystem 411 is dependent upon the communication network in which the mobile station 400 is intended to operate. For example, a mobile station 400 may include a communication subsystem 411 designed to operate within the Mobitex™ mobile communication system, the DataTAC™ mobile communication system, a GSM network, a GPRS network, a UMTS network, and/or an EDGE network.

Network access requirements vary depending upon the type of communication system. For example, in the Mobitex and DataTAC networks, mobile stations are registered on the network using a unique personal identification number or PIN associated with each device. In UMTS and GSM/GPRS networks, however, network access is associated with a subscriber or user of a device. A GPRS device therefore requires a subscriber identity module, commonly referred to as a SIM card, in order to operate on a GSM/GPRS network.

When required network registration or activation procedures have been completed, the mobile station 400 may send and receive communication signals over the communication network 419. Signals received by the antenna 416 from the communication network 419 are routed to the receiver 412, which provides signal amplification, frequency down conversion, filtering, channel selection, etc., and may also provide analog to digital conversion. Analog-to-digital conversion of the received signal allows the DSP to perform more complex communication functions, such as demodulation and decoding. In a similar manner, signals to be transmitted to the network 419 are processed (e.g., modulated and encoded) by the DSP 420 and are then provided to the transmitter 414 for digital to analog conversion, frequency up conversion, filtering, amplification and transmission to the communication network 419 (or networks) via the antenna 418.

In addition to processing communication signals, the DSP 420 provides for receiver 412 and transmitter 414 control. For example, gains applied to communication signals in the receiver 412 and transmitter 414 may be adaptively controlled through automatic gain control algorithms implemented in the DSP 420.

In a data communication mode, a received signal, such as a text message or web page download, is processed by the communication subsystem 411 and input to the processing device 438. The received signal is then further processed by the processing device 438 for output to a display 422, or alternatively to some other auxiliary I/O device 428. A device user may also compose data items, such as email messages, using a keyboard 432 and/or some other auxiliary I/O device 428, such as a touchpad, a rocker switch, a thumb-wheel, or some other type of input device. The composed data items may then be transmitted over the communication network 419 via the communication subsystem 411.

In a voice communication mode, overall operation of the device is substantially similar to the data communication mode, except that received signals are output to a speaker 434, and signals for transmission are generated by a microphone 436. Alternative voice or audio I/O subsystems, such as a voice message recording subsystem, may also be implemented on the device 400. In addition, the display 422 may also be utilized in voice communication mode, for example to display the identity of a calling party, the duration of a voice call, or other voice call related information.

The short-range communications subsystem 440 enables communication between the mobile station 400 and other proximate systems or devices, which need not necessarily be similar devices. For example, the short-range communications subsystem 440 may include an infrared device and associated circuits and components, or a Bluetooth™ communication module to provide for communication with similarly-enabled systems and devices.

This written description uses examples to disclose the invention, including the best mode, and also to enable a person skilled in the art to make and use the invention. The patentable scope of the invention may include other examples that occur to those skilled in the art.

It is claimed:

1. A wireless server for use within a wireless network, comprising:
    a communication subsystem operable to send and receive communications over the wireless network;
    a memory subsystem operable to store data and program information, including a server database;
    a processing subsystem operable to store and retrieve data in the memory subsystem, execute programs stored in the memory subsystem, and cause the communication subsystem to transmit and receive communications over the wireless network; and
    a wireless server module stored in the memory subsystem and executed by the processing subsystem, the wireless server module when executed by the processing subsystem being operable to cause the wireless server to transmit a network address for the wireless server to a wireless client, the network address enabling the wireless client to communicate with the wireless server directly over the wireless network to access information in the server database;
    wherein the network address is an IP address of the wireless server, and the IP address is dynamically assigned by the wireless network;
    wherein the wireless server module includes an IP monitoring agent that is operable to monitor the IP address assigned to the wireless server and transmit an updated network address to an IP address exchange service if the IP address is changed, wherein the IP address exchange service is configured to forward the updated network address to a plurality of wireless clients that are registered to access information in the server database, the plurality of wireless clients including one or more wireless clients that are not in a communication session with the wireless server when the updated network address is forwarded;

wherein the IP address exchange service is external to the wireless server and maintains a list of all wireless clients that are registered to receive IP address updates from the wireless server.

2. The wireless server of claim 1, wherein the wireless server module causes the wireless server to transmit the network address from the wireless server to the wireless client in an electronic message (email) transmitted via an electronic messaging service.

3. The wireless server of claim 1, wherein the wireless server module causes the wireless server to transmit the network address from the wireless server to the wireless client in a short messaging server (SMS) message transmitted via a SMS messaging service center.

4. The wireless server of claim 1, wherein the wireless server module causes the wireless server to transmit the network address from the wireless server to the wireless client in a short messaging server (SMS) message transmitted via an IP address exchange service.

5. The wireless server of claim 4, wherein the IP address exchange service maintains a list of a plurality of wireless clients that are registered to access information in the server database.

6. The wireless server of claim 1 wherein the IP monitoring agent is operable to transmit an updated network address to the wireless client if the IP address is changed.

7. The wireless server of claim 6, wherein the IP monitoring agent determines a plurality of wireless clients that are registered to receive information from the wireless server and is operable to transmit an updated network address to the plurality of wireless clients if the IP address of the wireless server is changed.

8. The wireless server of claim 1, wherein the wireless server module is further operable to receive a network address of the wireless client to enable two-way communication between the wireless server and the wireless client directly over the wireless network.

9. A method of providing a wireless server having access to a database of information for use within a wireless network, comprising:

assigning a network address to the wireless server upon the wireless server connecting with an Internet service;

the wireless server initiating a communication by distributing the wireless server network address to a wireless client, the network address enabling the wireless client to communicate with the wireless server directly over a wireless network;

the wireless client being operable to access the database of information by communicating directly over the wireless network with the wireless server using the network address of the wireless server, wherein the network address of the wireless server is an IP address;

monitoring the IP address of the wireless server; and if the IP address of the wireless server changes, transmitting an updated network address to an IP address exchange service, located external to the wireless server, wherein the IP address exchange service is configured to forward the updated network address to the wireless client, the wireless client registered to access information in the database of information, wherein the IP address exchange service maintains a list of a plurality of wireless clients that are registered to receive IP address updates from the wireless server and forwards the updated network address to the plurality of wireless clients, the plurality of wireless clients including one or more wireless clients that are not in a communication session with the wireless server when the updated network address is forwarded.

10. The method of claim 9, further comprising receiving a network address for the wireless client at the wireless server to enable two-way communication between the first mobile station and the second mobile station.

11. The method of claim 9, further comprising:

consolidating an address space of two networks through a VPN or wide area network bridge using the mobile server, whereby a number of directly addressable IP addresses is increased.

12. The method of claim 9, wherein the wireless server distributes the network address to the wireless client in an e-mail transmitted via an electronic messaging service.

13. The method of claim 9, wherein the wireless server distributes the network address to the wireless client in an SMS message transmitted via an SMS messaging service center.

14. The method of claim 9, wherein the IP address of the wireless server is dynamically assigned by the wireless network;

the method further comprising:

monitoring the dynamic IP address of the wireless server; and if the dynamic address of the wireless server is changed, then transmitting an updated IP address for the wireless server to the wireless client, the updated IP address enabling the wireless client to communicate with the wireless server directly over the wireless network.

* * * * *